(12) United States Patent
Mailhot et al.

(10) Patent No.: US 7,336,840 B2
(45) Date of Patent: Feb. 26, 2008

(54) COMPRESSION METHOD FOR BINARY IMAGES

(75) Inventors: Gabriel Mailhot, Stoneham (CA); David Savard, Charlesbourg (CA); Sylvain Tremblay, Charlesbourg (CA)

(73) Assignee: Info Panama Service, Inc., Quebec, Quebec (CA)

( * ) Notice: Subject to any disclaimer, the term of this patent is extended or adjusted under 35 U.S.C. 154(b) by 694 days.

(21) Appl. No.: 10/940,018

(22) Filed: Sep. 14, 2004

(65) Prior Publication Data

US 2006/0056709 A1 Mar. 16, 2006

(51) Int. Cl.
*G06K 9/36* (2006.01)
*G06K 9/46* (2006.01)

(52) U.S. Cl. ...................... 382/244; 382/243

(58) Field of Classification Search ........... 382/232, 382/240, 244, 173
See application file for complete search history.

(56) References Cited

U.S. PATENT DOCUMENTS

| | | | |
|---|---|---|---|
| 3,980,809 A | 9/1976 | Cook | |
| 4,646,134 A | 2/1987 | Komatsu et al. | |
| 5,515,453 A | 5/1996 | Hennessey et al. | |
| 5,724,451 A * | 3/1998 | Shin et al. | 382/240 |
| 6,137,836 A | 10/2000 | Haataja et al. | |
| 6,281,903 B1 * | 8/2001 | Martin et al. | 345/421 |
| 6,304,605 B1 | 10/2001 | Haikonen et al. | |
| 6,389,175 B1 | 5/2002 | Wood et al. | |
| 6,567,186 B1 | 5/2003 | Jacob et al. | |
| 2002/0071041 A1 | 6/2002 | Pine | |
| 2002/0113797 A1 | 8/2002 | Potter et al. | |

\* cited by examiner

*Primary Examiner*—Phuoc Tran
(74) *Attorney, Agent, or Firm*—Ogilvy Renault, LLP; Isabelle Chabot

(57) ABSTRACT

A dynamic compression method and system for digital binary images encoded using a matrix of pixels, each pixel of the matrix of pixels having one of a first and a second color. The method comprises providing the image; defining a first color area type symbol, a second color area type symbol, a complex area type symbol and a coordinates area type symbol; defining a first color zone content symbol, a second color zone content symbol and a mixed color zone content symbol; dividing the image into 16×16 pixels areas; determining an area type for each area; assigning a type symbols to the area; for each complex area, recursively subdividing each mixed color zone into four quadrants; determining a color content for each quadrant; assigning a content symbol to the quadrant, until each pixel in the area is identified with the content symbol at any level of the subdividing; for each coordinates area, scanning the area in groups of four pixels; assigning a content symbol to each group; for each mixed color group, determining a color of each pixel; assigning a content symbol to each pixel; storing all assigned type and content symbols into a compression data file for the image.

23 Claims, 18 Drawing Sheets

COMPRESSION METHOD FOR BINARY IMAGES

BACKGROUND OF THE INVENTION

1. Field of the invention

The present invention is related to methods of compression of binary digital images. More precisely, it relates to the compression of a pixel matrix depending on the image composition.

2. Prior Art

The Combined Quadtree compression applied to a black and white digital image allows treating each 16×16 zone according to its frequency in order to compress information. By identifying the high and the low frequencies, this method makes it possible to concentrate the majority of the treatment on the zones charged in graphic content. The method includes a tiling of the image in 16×16 pixel matrices (see FIG. 1A). Each 16×16 matrix is then subdivided in four matrices of 8×8 pixels (see FIG. 1B). Each matrix of 8×8 pixels is then subdivided in four matrices of 4×4 pixels (see FIG. 1C). Lastly, each matrix of 4×4 pixels is subdivided in matrices of 2×2 pixels (see FIG. 1D). The second stage consists in evaluating the total value of all the pixels constituting each 16×16 matrix. If all the pixels are black, the bits "00" are recorded. If all the pixels are white, the bits "01" are recorded. Lastly, if some pixels are white and some are black, the bits "10" are recorded. Only the symbols 00, 01 and 10 are used with the Combined Quadtree compression. If the matrix has been identified as being of the type "10", each 8×8 zone is evaluated according to the same notation. The calculation of the matrix is finished when there is no more "10" symbol to break up. The last stage uses only one bit per symbol, that is to say "0" for a black element and "1" for a white element (see FIG. 2 where "B" means Black, "W" means white and "G" means to be decomposed).

The Quadtree compression makes it possible to reduce the information necessary to represent an image and offers a fast and effective solution to reference a graphic element in a more complex graphical environment.

The principal drawback of the Quadtree method in the compression of black and white digital images is that it treats each tile independently one from another without taking into account the general composition of the treated document and the treatment of the preceding tiles. Moreover, the notation of the symbols at the time of the identification of the zones of the matrix is static and does not take into account the real population of pixels to be treated. Consequently, it is possible for the compression to create a compressed file with a size greater than that of the original document.

SUMMARY OF THE INVENTION

An object of this invention is to make a notable improvement to current compression methods in order to render the compression dynamic according to the contents of the treated digital image.

According to an aspect of the invention, it is shown a method which adds a fourth symbol which allows a Cartesian treatment of a 16×16 matrix.

According to another aspect of the invention, it is shown an adaptation of the nomination of the symbols to the real population of the zone treated to reduce the information required at the time of the recording of the data processed on a storage medium.

Other aspects of the invention teach the integration of a dictionary of symbols related to the identified zones in order to eliminate the redundant processing by associating a symbol to each identified zone for future reference. This dictionary is referenced within the data file thereby eliminating the use of a separate file or a long header for the conversion codes.

In relation with the dictionary of symbols, it is shown a method of connection of the symbols with an aim to creating other references to sequences of symbols being able to repeat themselves in the same order.

A method of dynamic compression of pixel information using a pixel matrix is described. The algorithm teaches an alternative to the Combined Quadtree compression (2D) algorithm depending on the statistical data of each zone identified and uses a "Z" scanning referenced with Cartesian co-ordinates. For example, the source image contained in the pixel matrix is subdivided in areas of 16×16 pixels. Each area is then traversed and evaluated according to its contents by identifying the zones as black, white, complex or with co-ordinates. An area identified as complex will be treated using an alternative of the Combined Quadtree compression. An area identified as an area of the coordinate's type will be treated with a derivative of the displacement of Morton (displacement in "Z") in combination with a linear displacement starting from a zone defined inside the treated area. The defined zone will be placed according to Cartesian co-ordinates.

There is also an alternative of the algorithm which records a single specimen of each area treated and associates them with a symbol. The symbols are then encoded in order to refer several adjacent symbols (words) presenting a certain redundancy in the document within the data file. In all cases, once the data is processed, a file is generated for the recording of the data on a storage unit.

Accordingly, a dynamic compression method for digital binary images encoded using a matrix of pixels, each pixel of the matrix of pixels having one of a first and a second color is taught. The method comprises providing the image; defining a first color area type symbol, a second color area type symbol, a complex area type symbol and a coordinates area type symbol; defining a first color zone content symbol, a second color zone content symbol and a mixed color zone content symbol; dividing the image into 16×16 pixels areas; determining an area type for each area; assigning a type symbols to the area; for each complex area, recursively subdividing each mixed color zone into four quadrants; determining a color content for each quadrant; assigning a content symbol to the quadrant, until each pixel in the area is identified with the content symbol at any level of the subdividing; for each coordinates area, scanning the area in groups of four pixels; assigning a content symbol to each group; for each mixed color group, determining a color of each pixel; assigning a content symbol to each pixel; storing all assigned type and content symbols into a compression data file for the image.

Additionally, a system for dynamic compression of digital binary images encoded using a matrix of pixels, each pixel of the matrix of pixels having one of a first and a second color is taught. The system comprises an image retriever, a symbol memory, a splitter for dividing the image into 16×16 pixels areas, a type determiner for determining an area type for each area; a type symbol retriever for assigning a type symbol to the area; a subdivider for recursively subdividing each mixed color zone into four quadrants in each complex area and instructing a content determiner for determining a color content for each quadrant and a content symbol retriever for assigning a content symbol to the quadrant, until each pixel in the area is identified with the content symbol at any level of the subdividing, a scanner for scanning each coordinates area in groups of four pixels and instructing the content determiner to determine a color content of each group of four pixels and the content symbol retriever to assign a content symbol to the group of four pixels and, for each group assigned with the mixed color zone symbol, determining a color of each pixel in the group; assigning a content symbol to each the pixel in the group; an output memory for storing all assigned type and content symbols into a compression data file for the image.

BRIEF DESCRIPTION OF THE DRAWINGS

Further features and advantages of the present invention will become apparent from the following detailed description, taken in combination with the appended drawings, in which:

FIG. 1 comprises FIG. 1A to FIG. 1D (prior art)

FIG. 8 comprises FIG. 8A and FIG. 8B.

FIG. 11 comprises FIG. 11A, 11B and 11C.

FIG. 16 illustrates the tiling of the image presented in FIG. 3 after its treatment by the method of compression presented in this document.

It will be noted that throughout the appended drawings, like features are identified by like reference numerals.

DETAILED DESCRIPTION OF THE PREFERRED EMBODIMENT

Even though the present description will be explained with reference to a black and white image, the methods and systems described can be applied to any binary image made up of any two constituent colors. In the case where an image containing colors other than black and white is used, the symbols detailed below simply need to be associated with the constituent colors. Preferably, a background color is white and a foreground color is black. Therefore, in the case where other colors are used, the symbols associated with white in the following description should preferably be associated with the background color and the symbols associated with black should be associated with the foreground color.

Figure 3:
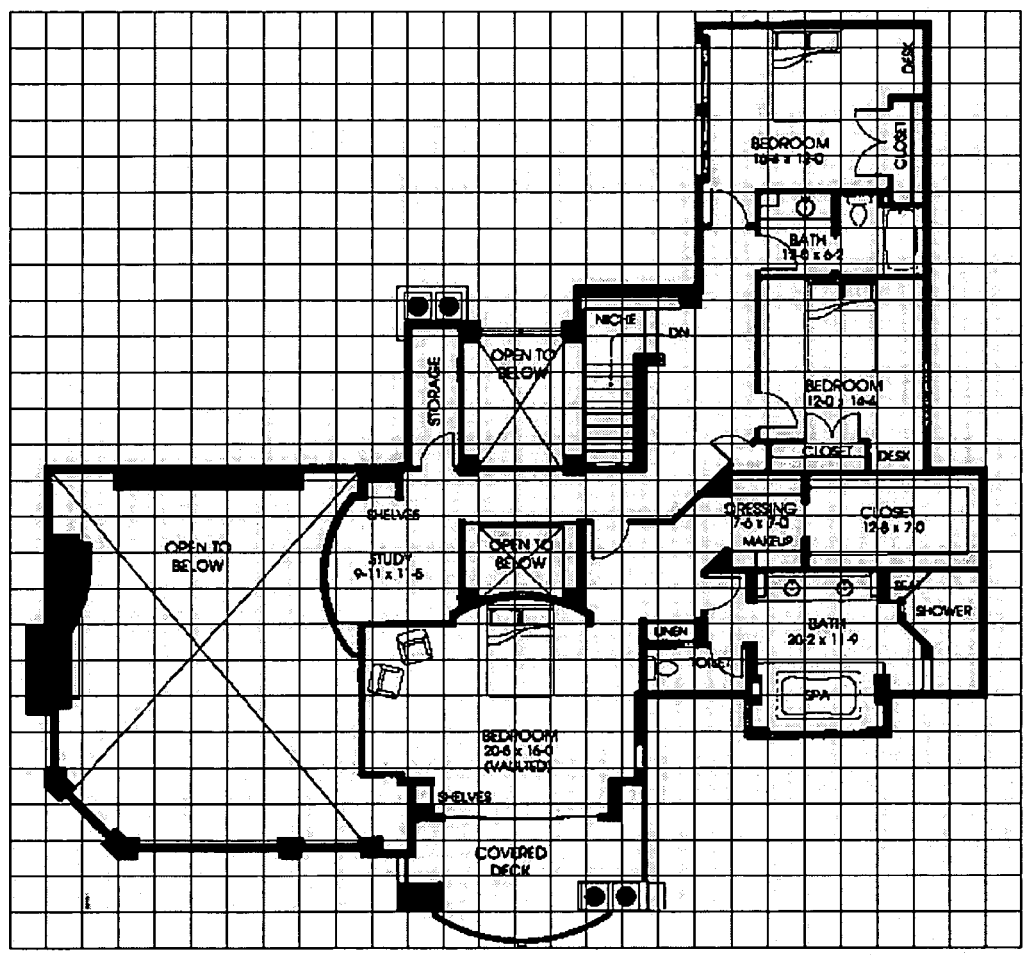
FIG. 3 illustrates the tiling of a 448×416 pixels image with 16×16 matrices before the treatment by the present invention.

A black and white digital image made up of a pixel matrix is subdivided using a tiling of 16×16 pixels matrices. In FIG. 3, the image has 448×416 pixels. A series of 728 16×16 pixels matrices are created. Each matrix is then evaluated with an algorithm (see FIG. 4 detailed below) which evaluates its type.

Figure 5:
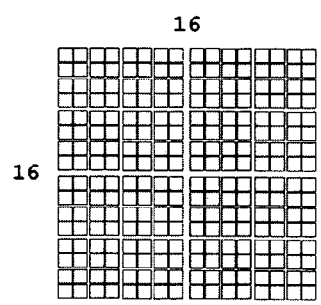
FIG. 5 illustrates a white matrix (referenced by the symbol "01")
Figure 6:
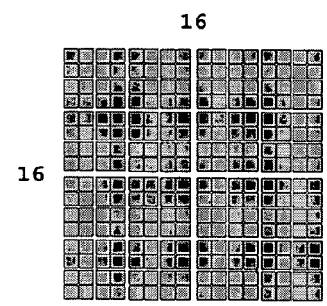
FIG. 6 illustrates a black matrix (referenced by the symbol "000")
Figure 7:
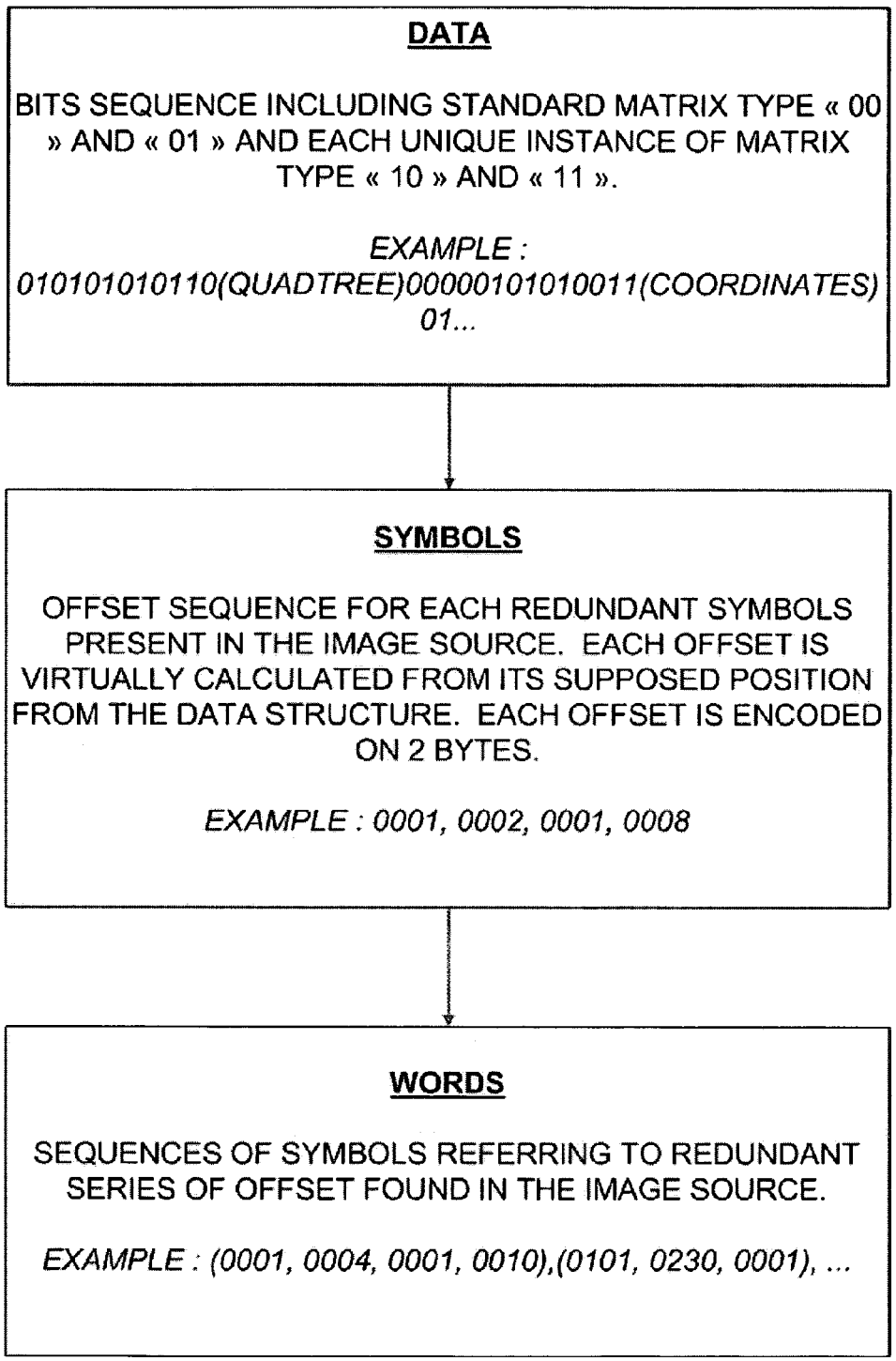
FIG. 7 illustrates the data structures as recorded on the storage medium, including the data, symbols and words buffers.

If a 16×16 matrix is completely white (see FIG. 5), the bits "01" are placed in the memory buffer called "DATA" (see FIG. 7). If the matrix is completely black (see FIG. 6), the bits "000" will be placed in this memory buffer.

Figure 8A:
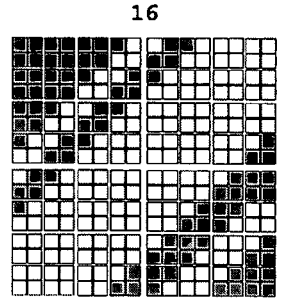
FIG. 8A illustrates a complex matrix (referenced by the symbol "10").

A matrix is of the "complex" type when it is made up of black pixels and white pixels and when the black pixels touch at the four sides of the matrix (see FIG. 8A). In this case, the bits "10" are placed in the DATA memory buffer, followed by a succession of bits generated by the algorithm presented in FIG. 4E. A copy will be placed in a temporary memory buffer called "DIC" (see FIG. 4F, FIG. 9) in order to check the future instances of each symbol. If a complex matrix corresponds to a similar matrix indexed in the DIC buffer, then the position in the list of bits of the DATA buffer of the first instance of the matrix treated is recorded in the memory buffer called "SYMBOLS". For example, FIG. 10 illustrates thirty matrices encoded in the DATA memory buffer including one complex matrix and two coordinates matrices. The DIC buffer keeps a temporary reference of these two matrices (see FIG. 9, [907], [911]), as well as their positions in the DATA buffer (see FIG. 9, [909], [913]). The SYMBOLS memory buffer contains a reference which indicates which symbol should substitute the 001 bits placed in the DATA memory buffer. Only the data of the DATA and SYMBOLS buffers will be transcribed in a file intended for the storage unit (see FIG. 10). The DIC buffer is released at the end of the process of compression.

Figure 8B:
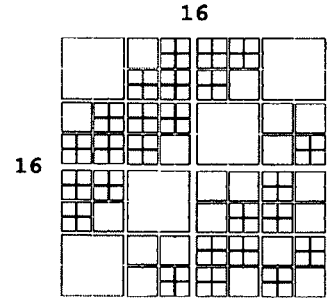
FIG. 8B illustrates a Quadtree subdivision of the complex matrix of FIG. 8A as is done in the prior art.

FIG. 8B shows a Quadtree subdivision of the complex matrix of FIG. 8A as is done in the prior art.

Figure 1A:
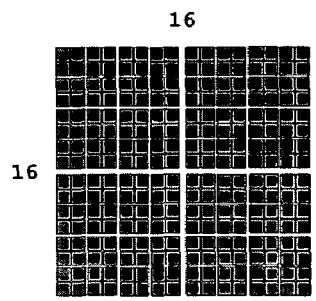
FIG. 1A illustrates the surface of the first level of the Quadtree decomposition of the matrix. This stage of treatment is called the surface 16.
Figure 1B:
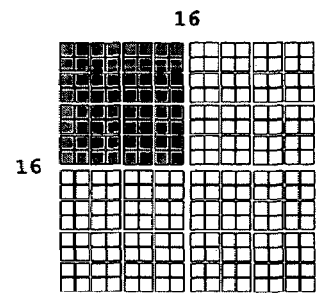
FIG. 1B illustrates the surface of the second level of the Quadtree decomposition of the matrix. This stage of treatment is called the surface 8.
Figure 1C:
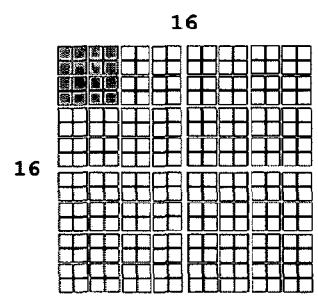
FIG. 1C illustrates the surface of the third level of the Quadtree decomposition of the matrix. This stage of treatment is called surface 4.
Figure 1D:
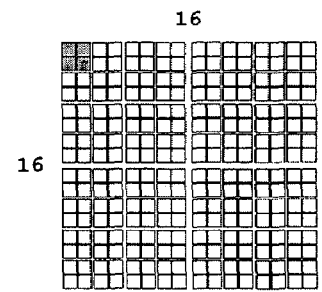
FIG. 1D illustrates the surface of the fourth level of the Quadtree decomposition of the matrix. This stage of treatment is called the surface 2.
Figure 2:
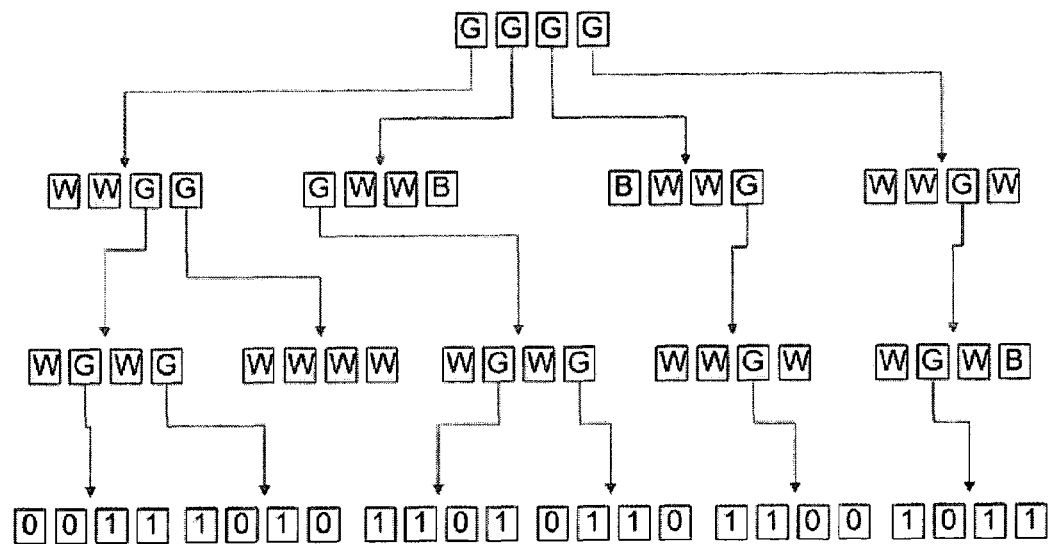
FIG. 2 illustrates an example of the combined Quadtree compression using the symbols "B", "W" and "G" (prior art)
Figure 4A:
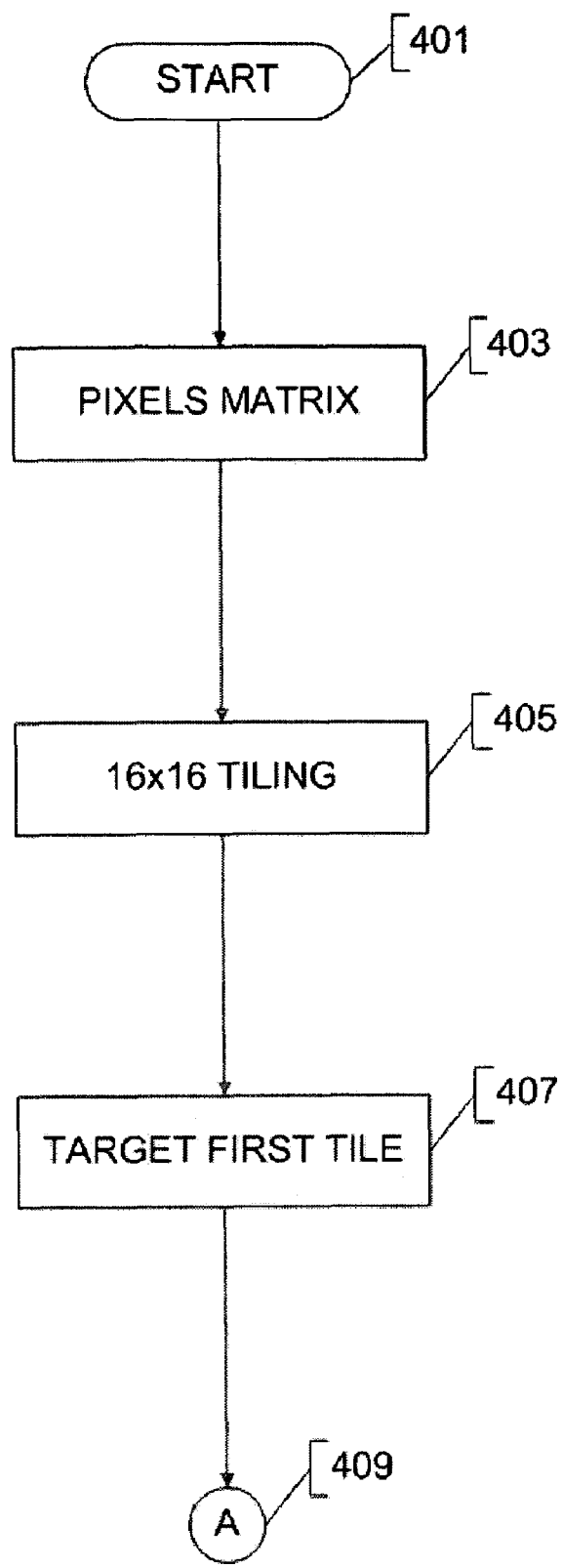
FIG. 4 comprises FIG. 4A to FIG. 4I and lists the steps of the algorithm used to determine which type of compression must be applied to each identified matrix of an image.
Figure 4B:
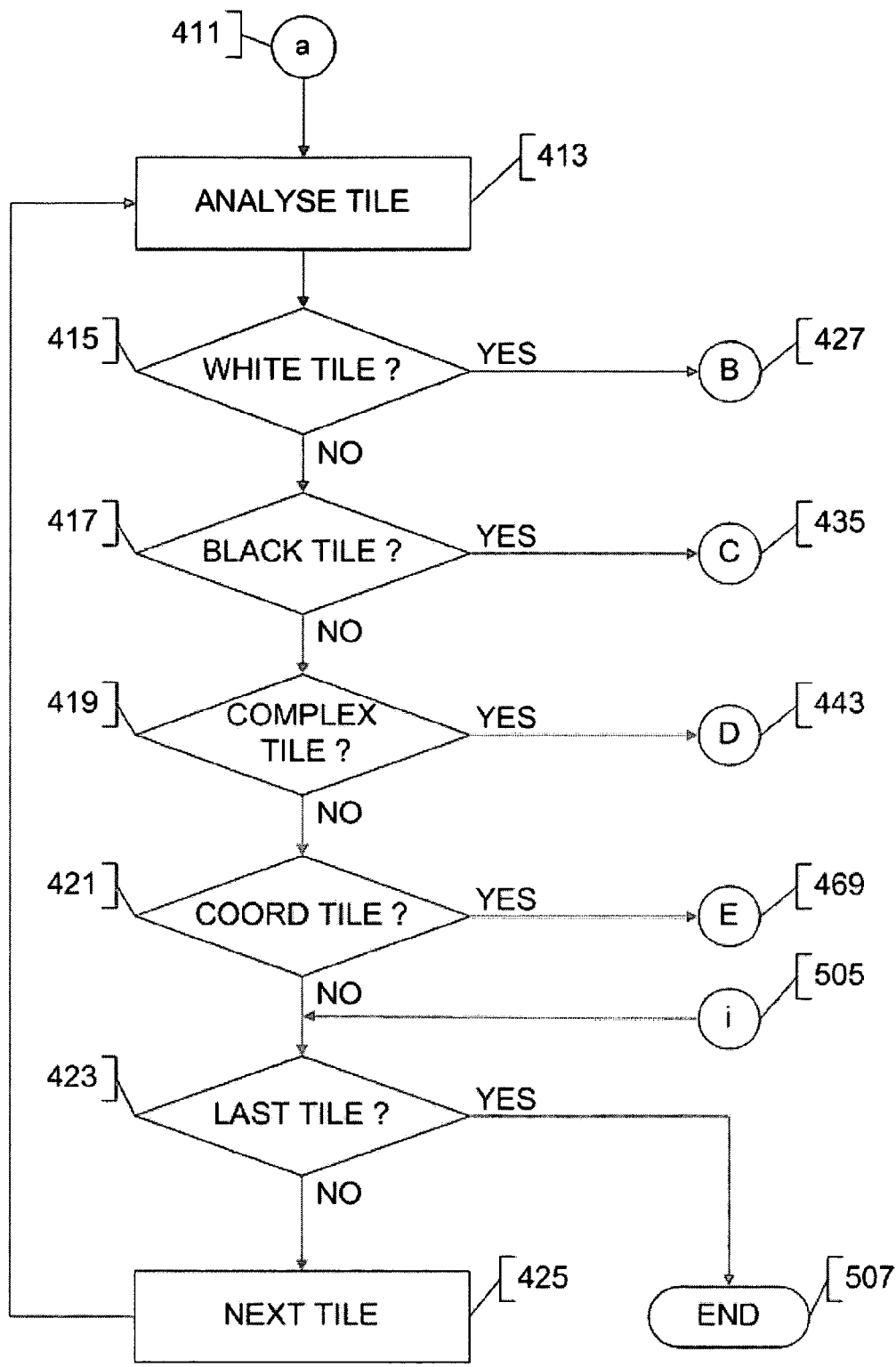
Figure 4C:
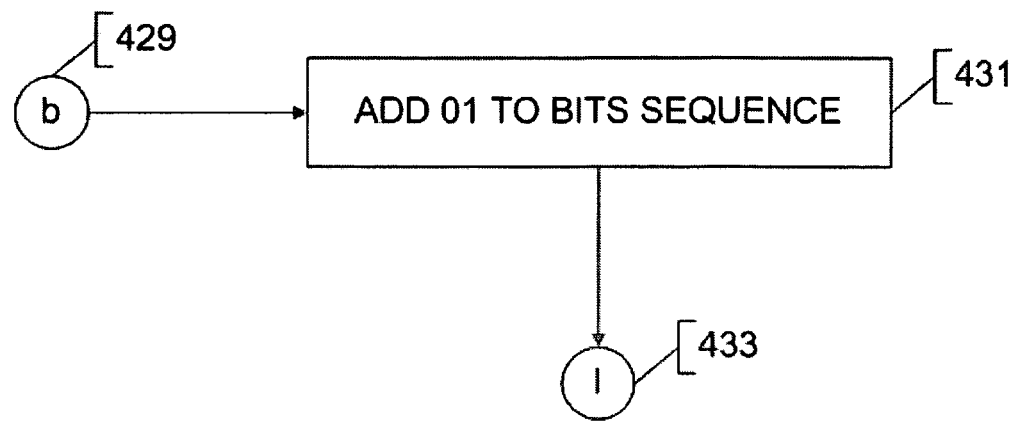
Figure 4D:
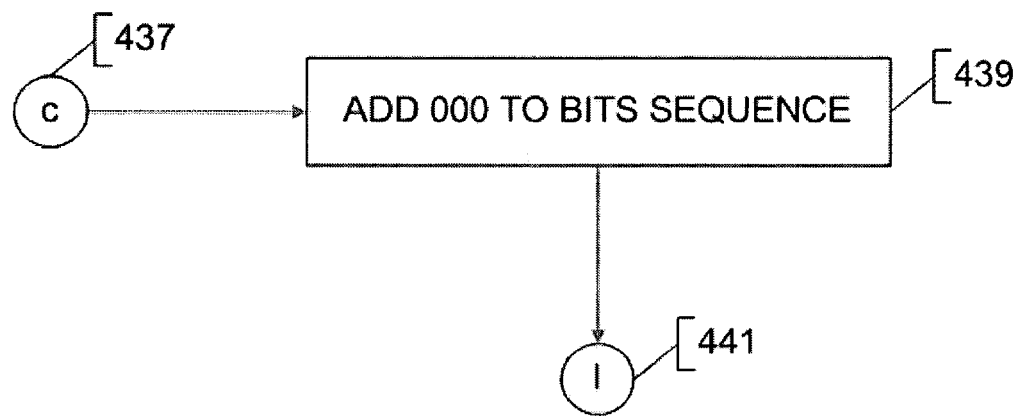
Figure 4E:
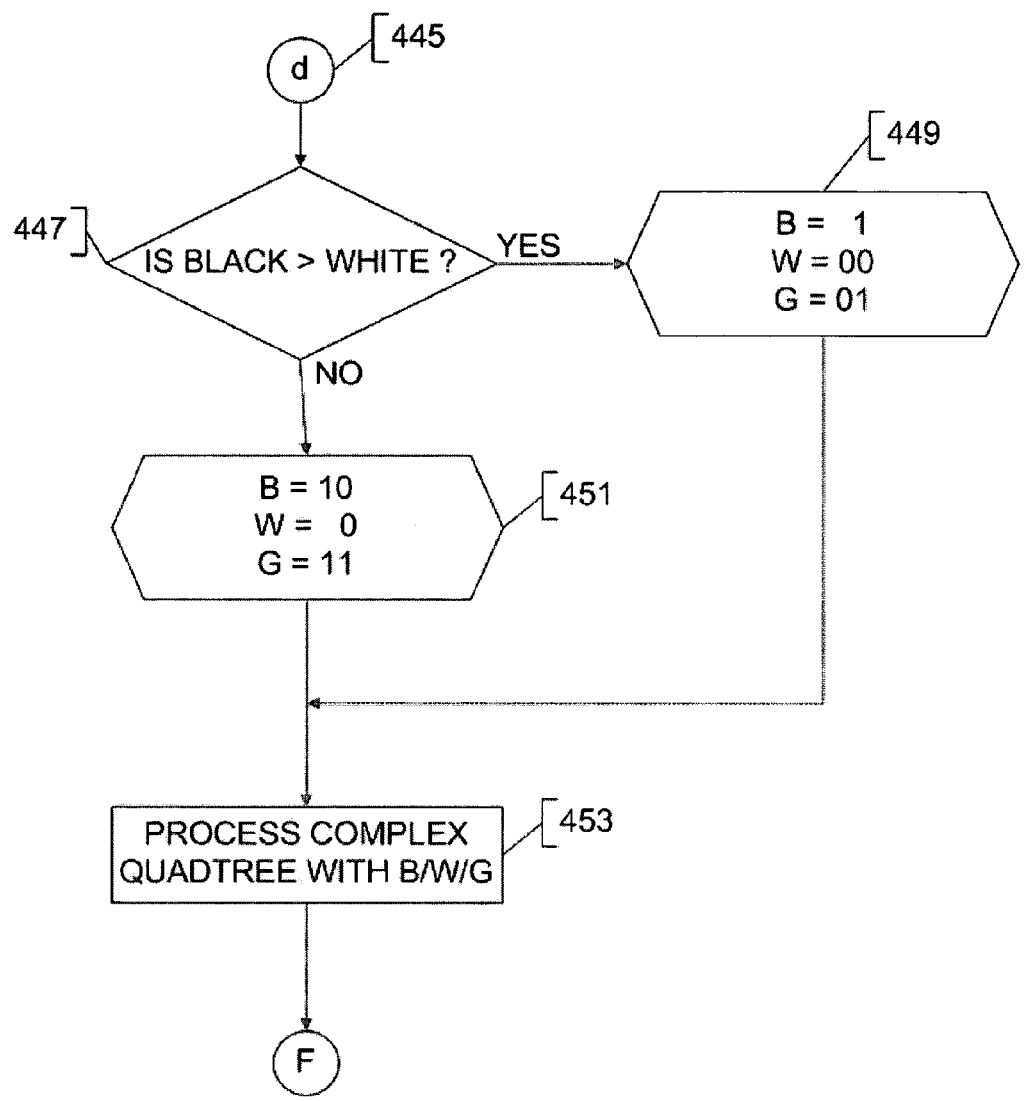
Figure 4F:
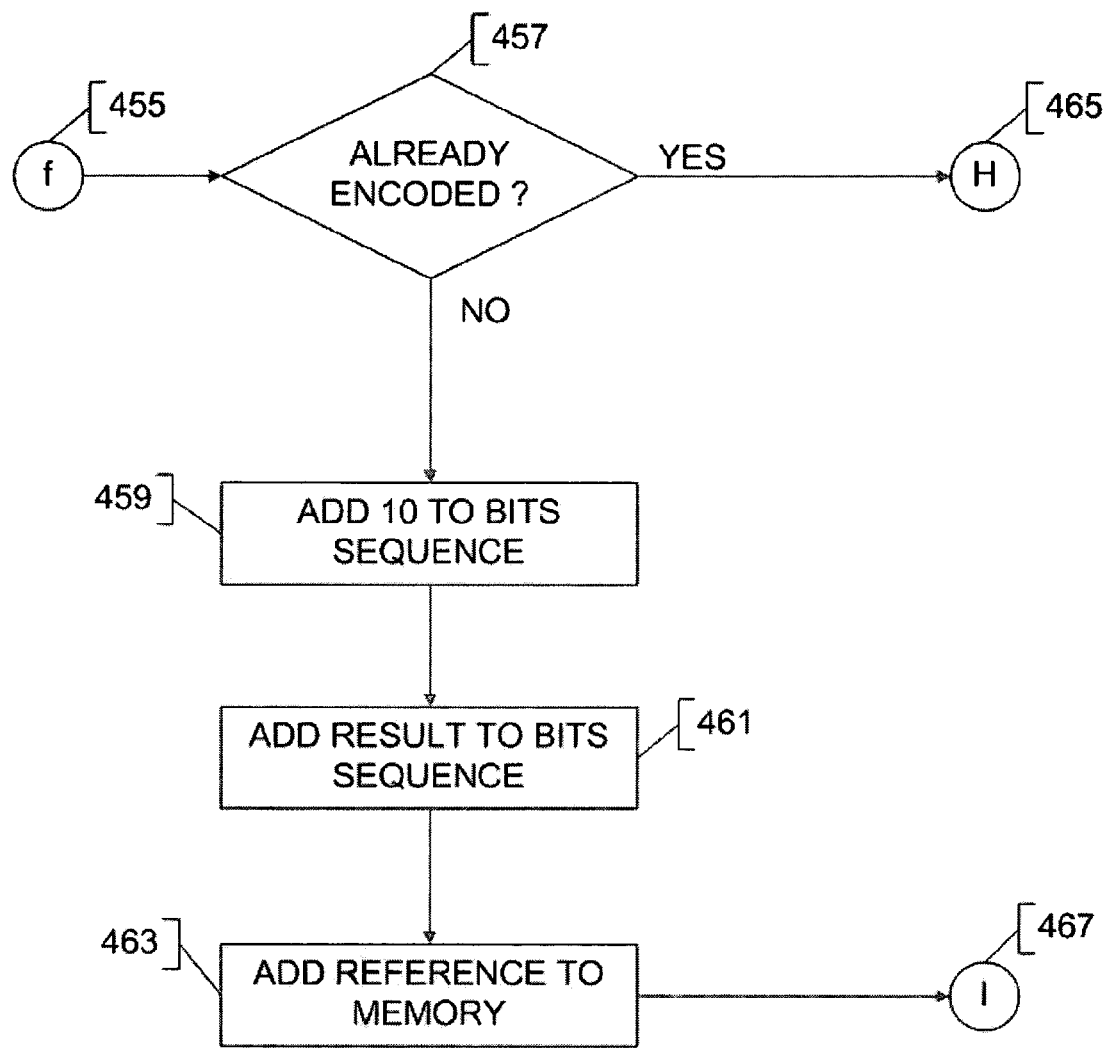
Figure 4G:
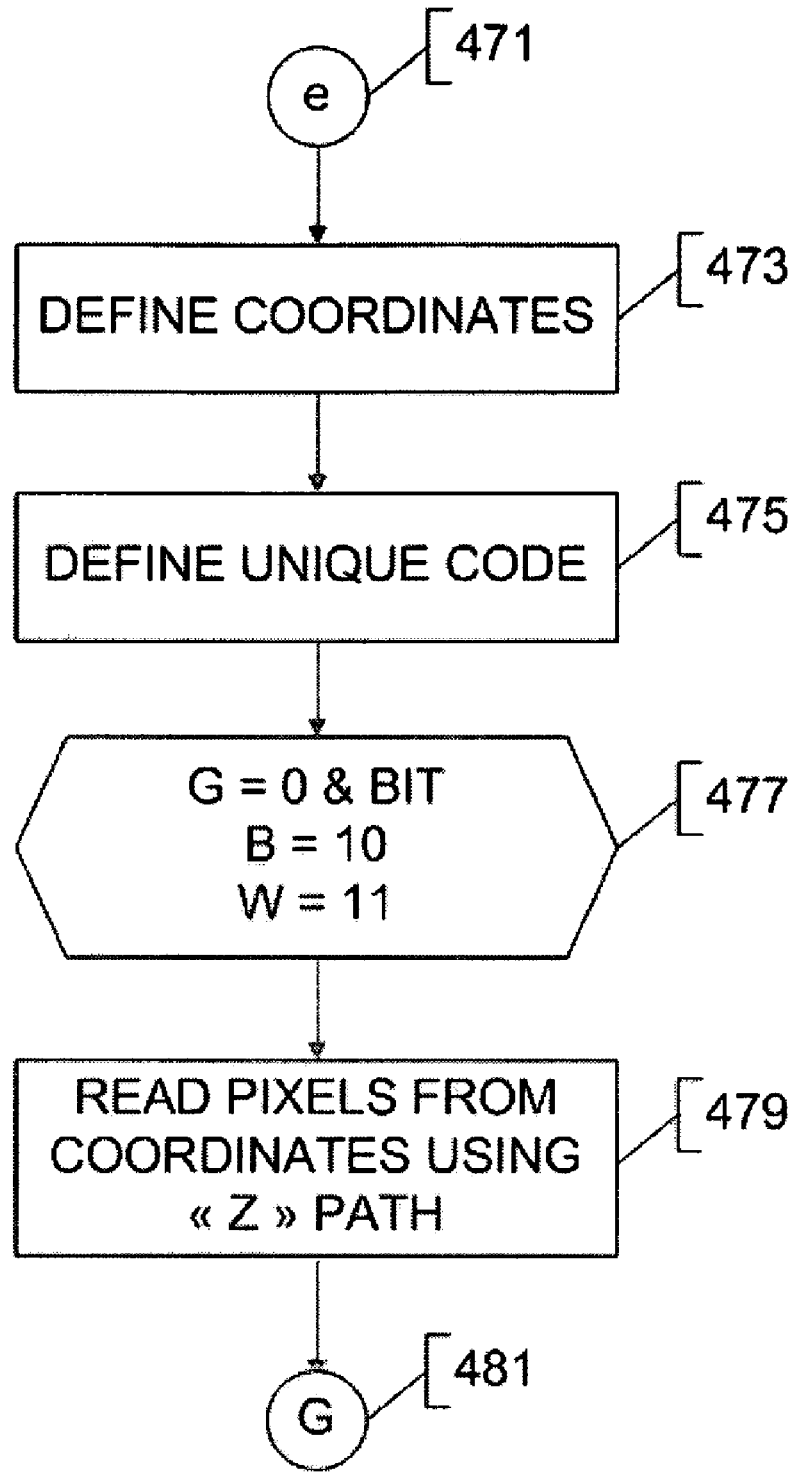
Figure 4H:
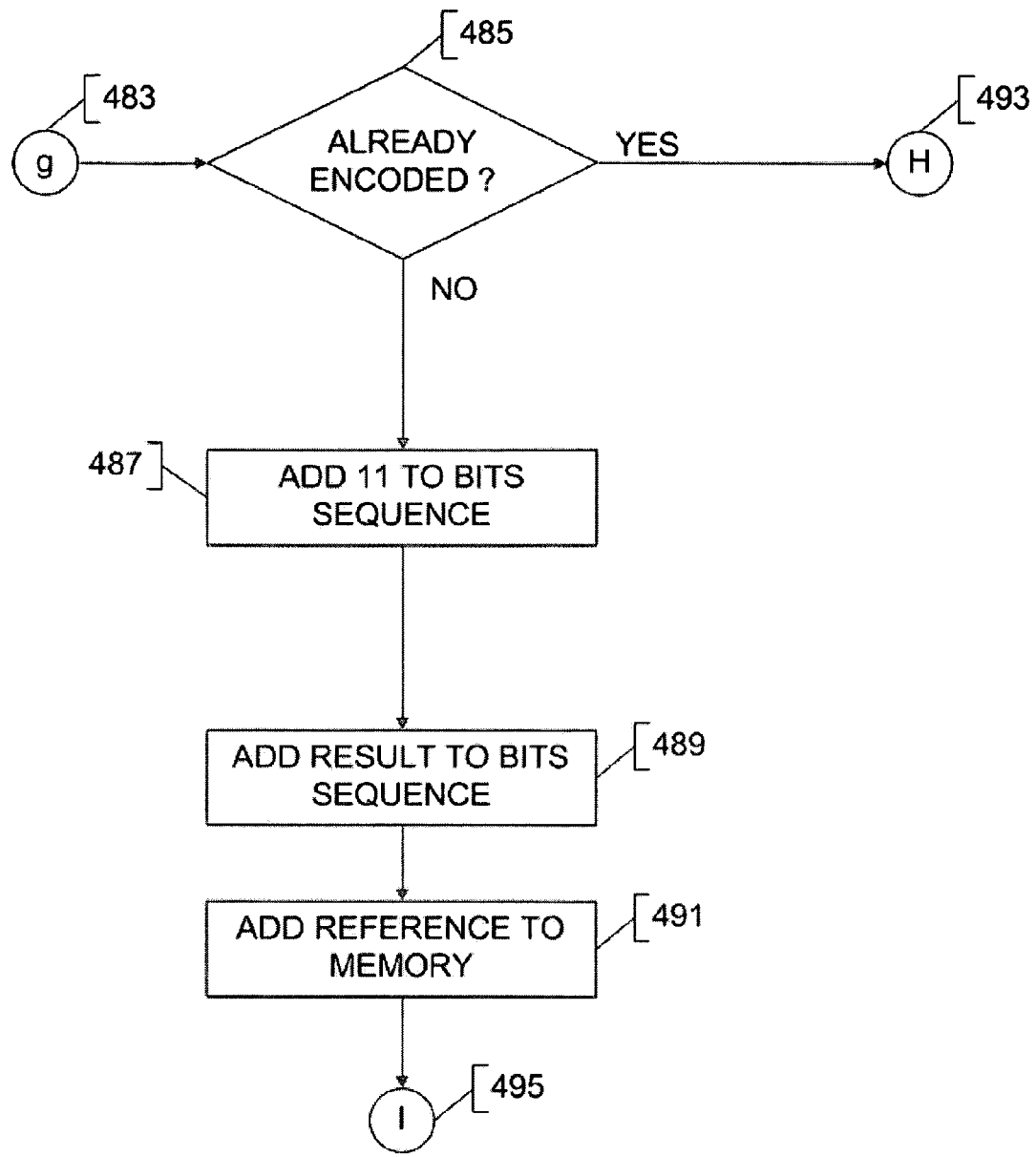
Figure 4I:
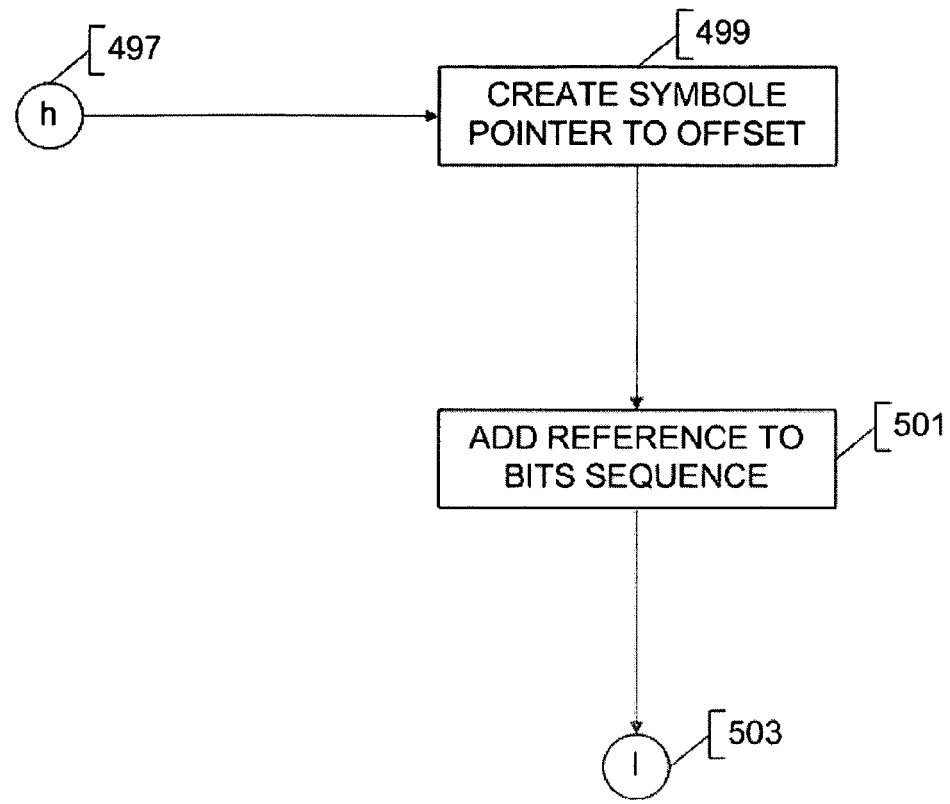

The list of bits generated for the "complex" matrix is obtained using an alternative of the Combined Quadtree method associated with a dynamic model of symbols which is adjusted according to the statistics of the matrix (see FIG. 4B). The method begins to treat the four 8×8 pixels zones (see FIG. 1A) and assigns symbol "B" if the treated zone is completely black, "W" if the zone is entirely white and "G" if the matrix is made up of black and white pixels. A zone identified by the symbol G will be re-evaluated on a lower level (see FIGS. 1B, 1C, 1D) until the end symbols all are W or B. FIG. 2 illustrates the hierarchy of the Quadtree compression. Using the assignment of the dynamic values of symbols, the Quadtree compression is optimized and generates less information. In the example of FIG. 2 using the assigned standard symbols, that is B=00, W=01, G=10, the following list of bits is generated:

{00 10 10 01 10 00 01 0 10 10 00 10 01 10 10 00 01 01 00 00 00 00 01 00 00 01 00 01 01 01 00 00}

Total: 64 bits

With the assignment of the dynamic symbol values specific to the present method of compression, where B=1, W=00, G=01, we obtain the following list of bits:

{1 01 01 00 01 1 00 00 00 01 1 01 00 01 01 1 00 00 1 1 1 1 00 1 1 00 1 00 00 00 1 1}

Total: 51 bits

Figure 11A:
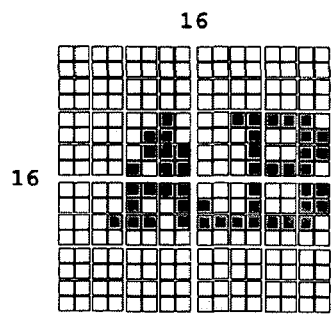
FIG. 11A illustrates a matrix of the type "co-ordinates" (referenced by the symbol "11").

Finally, a matrix is of the type "coordinates" when it is made up of black and white pixels and at least one of its four sides does not contain black pixels (see FIG. 11A). In this case, the bits "11" are placed in the DATA memory buffer, followed by a succession of bits generated by the application of the algorithm illustrated on FIG. 4F. A copy will be placed in a temporary memory buffer DIC in order to check the future instances of each symbol.

If a complex matrix corresponds to a similar matrix indexed in the DIC buffer, then the position in the list of bits of the DATA buffer of the first instance of the matrix is recorded in the SYMBOLS memory buffer and referred in the DATA memory buffer with the "001" symbol.

Figure 11B:
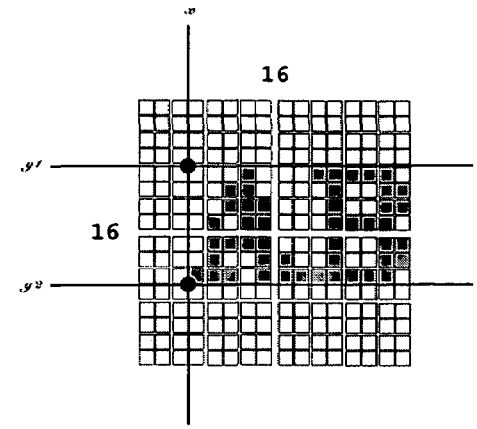
FIG. 11B is an example of a coordinates matrix with a frame of reference known as of type 4.
Figure 11C:
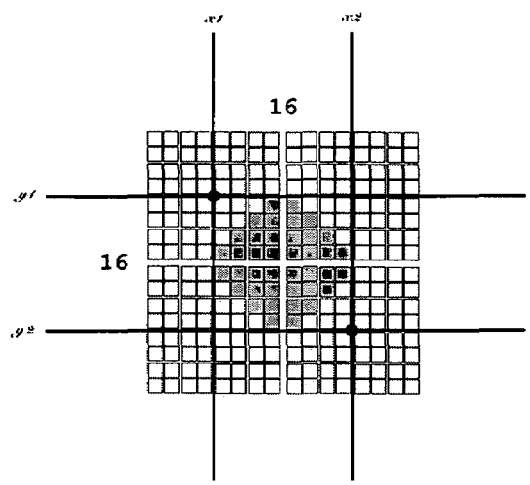
FIG. 11C is an example of a coordinates matrix with a frame of reference known as of type 0.
Figure 12A:
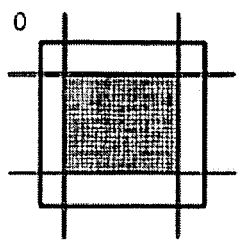
FIG. 12 comprises FIG. 12A to 12P and illustrates the types of matrices with possible co-ordinates associated with a single number from 0 to 15.
Figure 12B:
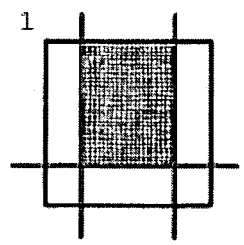
Figure 12C:
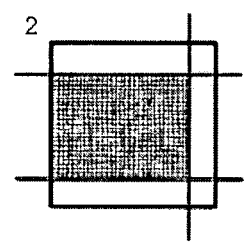
Figure 12D:
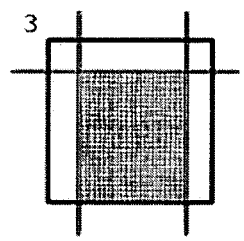
Figure 12E:
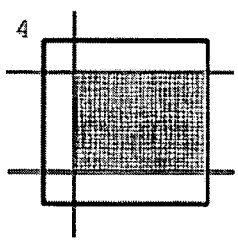
Figure 12F:
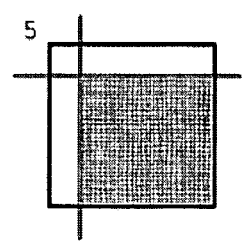
Figure 12G:
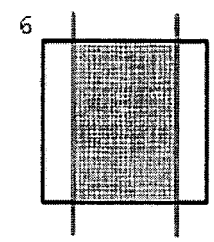
Figure 12H:
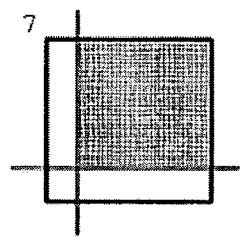
Figure 12I:
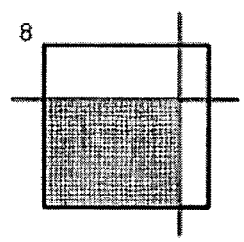
Figure 12J:
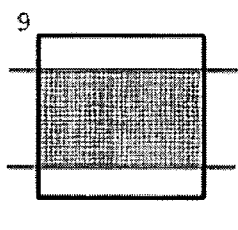
Figure 12K:
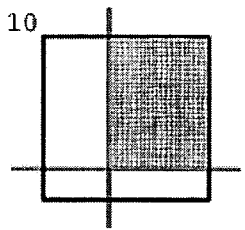
Figure 12L:
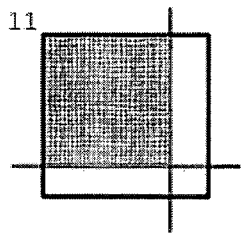
Figure 12P:
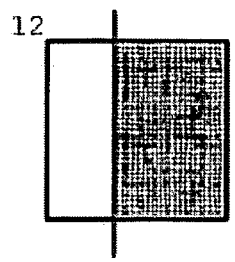
Figure 12P:
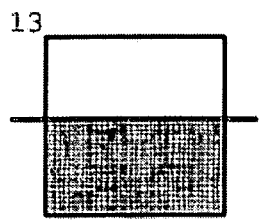
Figure 12P:
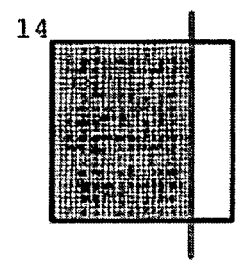
Figure 12P:
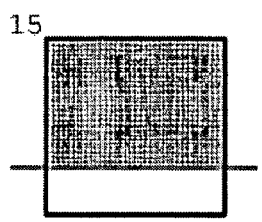
Figure 13:
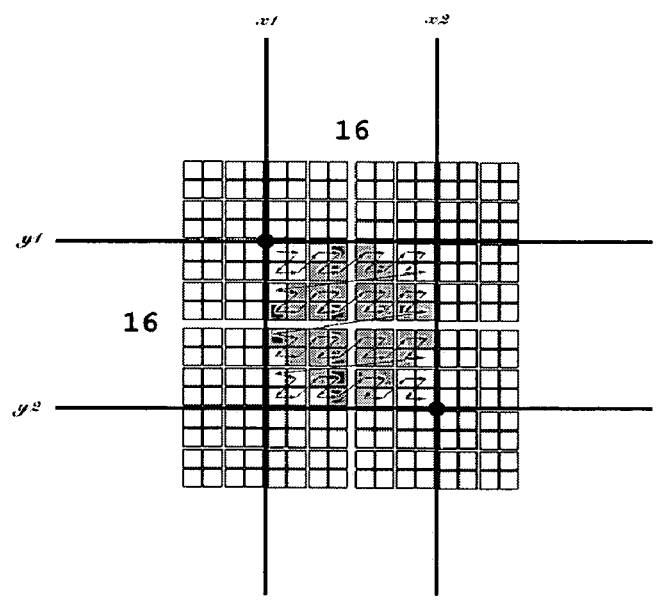
FIG. 13 illustrates the linear scanning in "Z" carried out in the zone of a matrix with co-ordinates of the type 0.

The list of bits generated for the matrix of the type "coordinate" is obtained by identifying the internal borders of the information in the matrix (see FIG. 11B and FIG. 11C). The algorithm assigns a unique symbol representing the type of border present in the matrix (see FIG. 12). For example, the matrix of FIG. 11B is represented by the unique symbol "0100" (the number 4 in bits) and the matrix of FIG. 11C is represented by the symbol "0000". The content of the zone identified by the frame of reference are encoded using a scanning in "Z" carried out from left to right, from top to bottom (see FIG. 13). Each group of four pixels (2×2) is encoded according to a convention where the symbol "10" is allotted when the group is black, "11" when the group is white and "0" followed by a sequence of four bits when the group is made up of black pixels and white pixels. The example of FIG. 11C generates the following list of bits:

[UNIQUE SYMBOL]+[x1 x2 y1 y2]+[bits]

[0000]+[0011 1011 0011 1011]+{11 01000 00100 11 01000 00 00 00100 00010 00 00 00001 11 00010 0 001 11}

Total: 80 bits

For comparison purposes, here is the list of bits generated by the Quadtree compression with dynamic symbols, where B=1, W=00, G=01:

{00000001 00000100 00010000 01000000 0001011 0100101 0110001 1010100 1000 0100 1000010000100001 00100111}

Total: 92 bits

Finally, here is the result if the image is encoded according to the standard Combined Quadtree compression:

{10101010 01010110 01011001 01100101 10010101 01101000 10010010 10000110 00101001 1000 0100 1000 0100 0010 0001 0010 0001}

Total: 104 bits

Contrary to the standard dictionaries used in other data compressions, the structure of the dictionary of symbol of the present invention is integrated within the data compressed using position references. These references indicate the exact position of the symbol to be copied in the file as well as the matrix in which the symbol must be reproduced. Only the symbols "10" and the symbols "11" are thus referenced (see FIG. 7, FIG. 9, FIG. 10). This practice avoids having to integrate a collection of symbols in the heading of the compressed file and consequently decreases the necessary space on the storage unit.

It is also possible to gather symbols in order to reproduce a continuation of symbol to be recopied. This aggregation of symbols is called a "WORD" and is encoded at the end of the recording on the storage unit (see FIG. 7, FIG. 14A to 14C, FIG. 15). Each word is recorded in the form:

[1st symbol] . . . [Last symbol] [Destination]

Figure 14C:
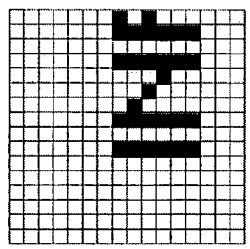
FIG. 14 comprises FIG. 14A, 14B and 14C and illustrates a collection of three matrices indexed and referenced by "S" symbols.
Figure 14B:
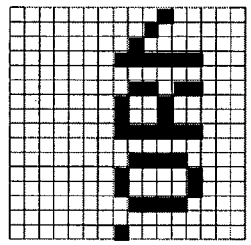
Figure 14A:
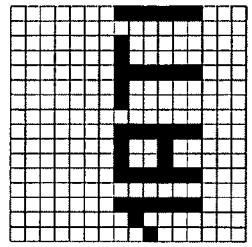
Figure 15:
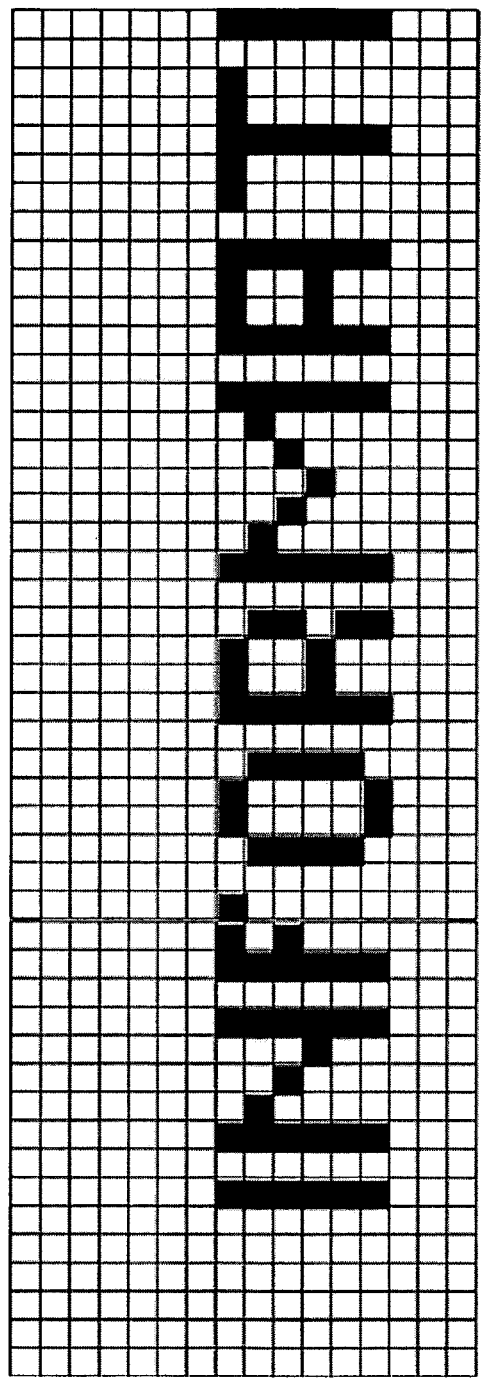
FIG. 15 illustrates the concatenation of the three matrices of FIG. 14 to create a "P" group. The "P" group is also called a "word"
Figure 16:
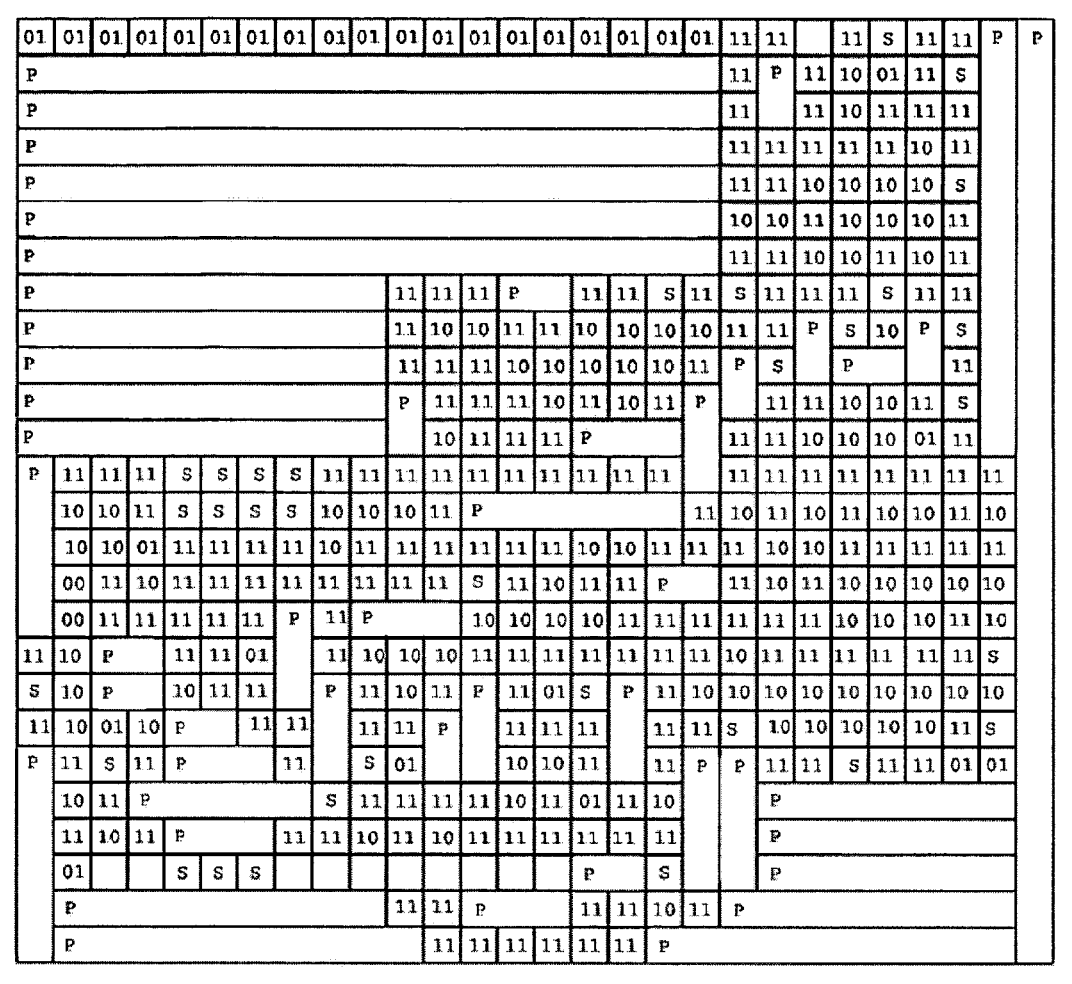

FIG. 14A to 14C are symbols previously identified by the algorithm and FIG. 15 is an aggregation of these symbols. In the example illustrated in FIG. 16, the sections of the type "P" represent references to a WORD encoded in the compressed file.

The algorithm illustrated in FIG. 4 will now be explained in detail. The compression process imports a pixel matrix in memory [403] and it is subdivided in 16×16 pixels matrices [405]. This process is called "tiling". The algorithm then points to the first tile in the upper left corner [407] and analyses its pixel content [413]. If all pixels are white [415] (see FIG. 5), the algorithm will add "01" bits in the DATA memory buffer [431] and will loop back to its tile reading process [505]. If all the pixels are black [417] (see FIG. 6), the algorithm will add "000" bits in the memory buffer [439] and will loop back to its tile reading process [505].

If the matrix consists of white and black pixels and every side of the matrix has at least one black pixel (see FIG. 8A), it will be processed as a "COMPLEX" type matrix [419]. The algorithm determines what type of pixels has the biggest population [447]. If the matrix has a majority of black pixels, the B symbol will be assigned to "1" bit, the W symbol will be assigned to "00" bits and the G symbol will be assigned to "01" bits [449].

On the contrary if the matrix has a majority of white pixels, the B symbol will be assigned to "10" bits, the W symbol will be assigned to "0" bit and the G symbol will be assigned to "11" bits [451]. The algorithm will compile the bits sequence using a complex Quadtree compression with the symbols defined in 449 or 451 [453]. Afterwards, the algorithm verifies if the result has been previously encoded by comparing the results with the DIC memory buffer [457].

Figure 9:
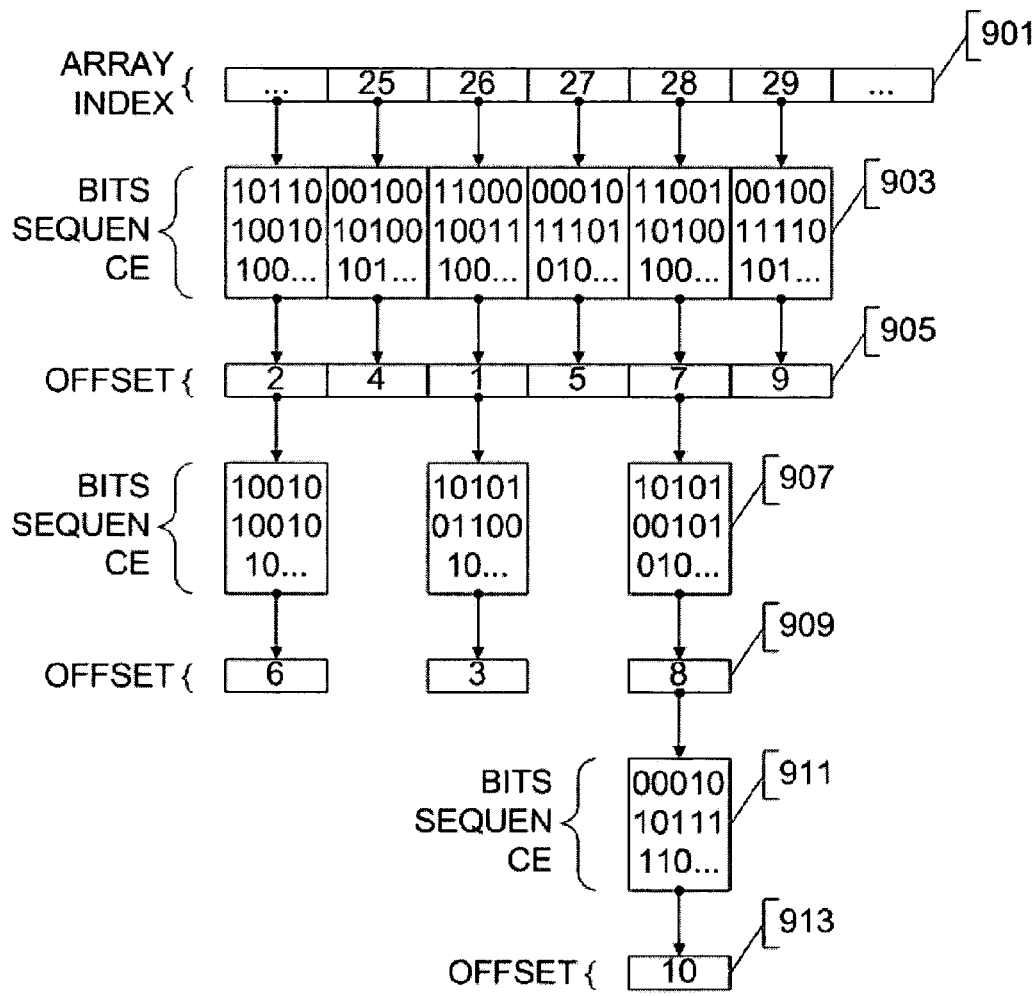
FIG. 9 illustrates the role of the memory buffers at the time of the process of compression for calculation of the reference symbols.
Figure 10A:
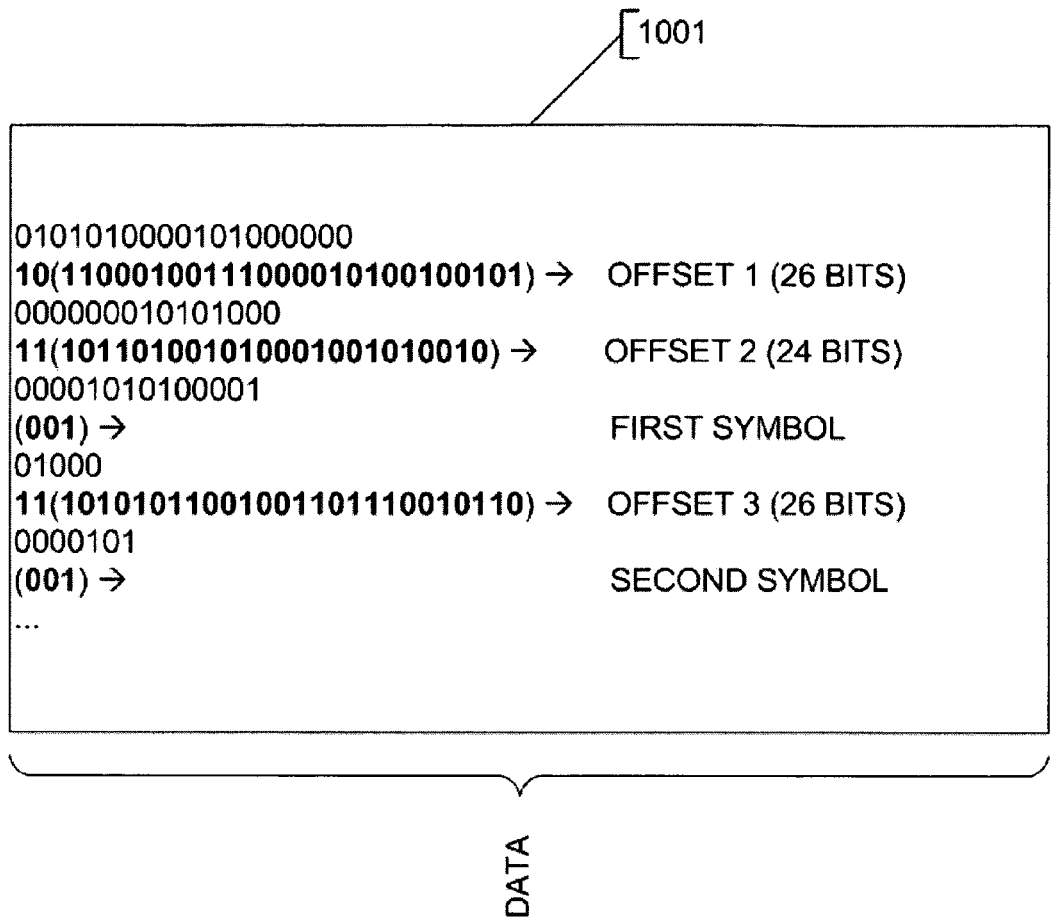
FIG. 10 comprises FIG. 10A and 10B and illustrates the memory contents for the DATA and SYMBOL buffers which are used to store the file on a storage medium.
Figure 10B:
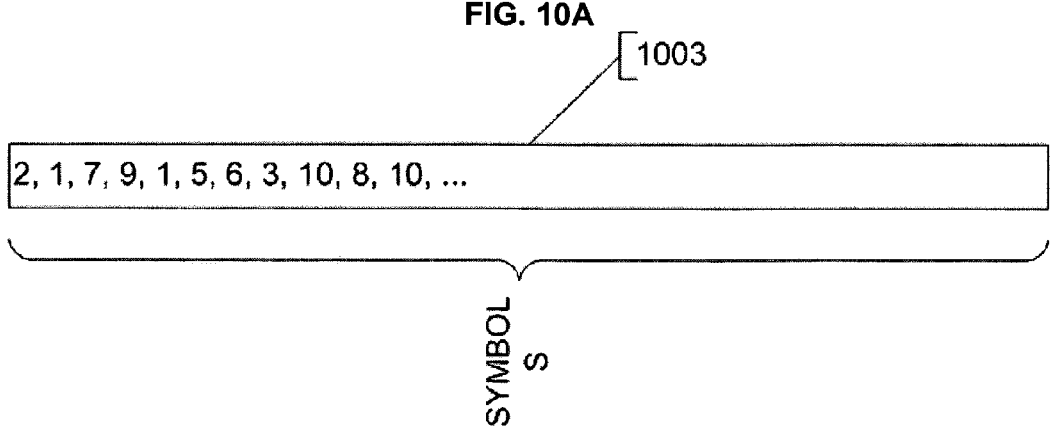

If the result does not appear in the DIC buffer, then the "10" bits [459], followed by the list of bits are added to the DATA buffer [461] (see FIG. 10) and an exact copy is added to the DIC buffer [463] (see FIG. 9).

If the result has already been added to the DIC buffer, then a virtual position pointer is created [499] in order to reference the result from its position in the DATA buffer. The referential pointer is added to the SYMBOLS buffer [501] (see FIG. 10). The virtual position pointer comprises the bits "001" which are added to the DATA buffer [499] in order to reference a matrix previously encoded in the DATA buffer. The 001 pointer points to an offset coded in the SYMBOLS buffer which indicates which matrix must be copied at the 001 pointer during decompression of the file.

If the matrix consists of black and white pixels and there is at least one side with only white pixels, it will be processed like a COORDINATES type matrix [421] (see FIG. 11A). The algorithm defines the borders of the black pixels within a Cartesian coordinates system from a 16×16 pixels matrix [473] (see FIG. 11B, FIG. 11C). Depending on the borders, a unique code will be assigned [475] (see FIG. 12). The "G" symbol is assigned to the "0" bit, the "B" symbol with "10" and the "W" symbol with "11". The pixel content between the borders is encoded following a horizontal Z-path [479] (see FIG. 13). The encoded result is compared with the content of the DIC memory buffer [485]. If the result does not appear in the DIC buffer, the "11" bits [487], followed by the resulting bits are added to the DATA memory buffer [489] (see FIG. 10) and an exact copy is added to the DIC memory buffer [491] (see FIG. 9). If the result has already been added to the DIC buffer, then a virtual position pointer is created [499] in order to reference the result from its position in the DATA memory buffer. The referential pointer is added to the SYMBOLS buffer [501] (see FIG. 10).

After the evaluation and the content compilation of the 16×16 matrix, the algorithm validates if this matrix is the last tile matrix to process in the image [423]. If it is not the case, the algorithm continues to the next tile [425] and will repeat the content analysis of the matrix [413]. If the tile is the last matrix to process from the source image, the compression process has ended [507] and the DATA buffer content followed by the SYMBOLS buffer content are recorded in a file for storage on a storage unit device.

While illustrated in the block diagrams as groups of discrete components communicating with each other via distinct data signal connections, it will be understood by those skilled in the art that the preferred embodiments can be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetical signal.

The embodiment(s) of the invention described above is(are) intended to be exemplary only. The scope of the invention is therefore intended to be limited solely by the scope of the appended claims.

What is claimed is:

1. A dynamic compression method for digital binary images encoded using a matrix of pixels, each pixel of said matrix of pixels having one of a first and a second color, comprising:
   providing said image;
   defining a type symbol for each one of a first color area, a second color area, a complex area and a coordinates area, wherein said area is square, said first color area is an area in which all pixels are of said first color, said second color region is a region in which all pixels are of said second color, said complex region is a region in which there is at least one pixel of said second color on each side of said region and said coordinates region is a region in which there is at least one side with only pixels of said first color;
   defining a content symbol for each one of a first color zone, a second color zone and a mixed color zone, wherein said first color zone is a zone in which all pixels are of said first color, said second color zone is a zone in which all pixels are of said second color and said mixed color zone is a zone in which there are pixels of said first color and said second color;
   dividing the image into 16×16 pixels areas;
   determining an area type for each area;
   assigning a corresponding one of said type symbols to said area;
   for each area determined to be of a complex type, recursively
      subdividing each mixed color zone into four quadrants;
      determining a color content for each quadrant;
      assigning a corresponding one of said content symbol to said quadrant;
   until each pixel in said area is identified with said content symbol at any level of said subdividing;
   for each area determined to be of a coordinates type,
      scanning said area in groups of four pixels;
      assigning a corresponding one of said content symbol to each group of four pixels of said area;
      for each group assigned with said mixed color zone symbol,
         determining a color of each pixel in said group;
         assigning a corresponding one of said content symbol to each said pixel in said group;
   storing all assigned type and content symbols into a compression data file for said image.

2. A method as claimed in claim 1, wherein said defining a content symbol for each one of a first color zone, a second color zone and a mixed color zone, further comprises:
   defining a complex content symbol for each one of said zones to be used if said area is of a complex type; and
   defining a coordinates content symbol for each one of said zones to be used if said area is of a coordinates type.

3. A method as claimed in claim 2, wherein said defining a complex content symbol comprises:
   comparing a number of first color pixels to a number of second color pixels in said area determined to be of a complex type to ensure that a most common one of said pixel color is encoded using a smallest content symbol.

4. A method as claimed in claim 3, wherein if said number of second color pixels is greater than said number of first color pixels, said content symbols are 1 for a second color zone, 00 for a first color zone and 01 for a mixed color zone and wherein if said number of second color pixels is smaller than said number of first color pixels, said content symbols are 10 for a second color zone, 0 for a first color zone and 11 for a mixed color zone.

5. A method as claimed in claim 1, further comprising:
   providing a border tag for each border type, wherein a border type is identified by a shape of a distribution of pixels in a coordinates area;
   determining a border type for said coordinates area;
   assigning a corresponding one of said border tags to said coordinates area.

6. A method as claimed in claim 5, wherein said border tag is coded using four bits.

7. A method as claimed in claim 1, further comprising:
   identifying a region of at least one symbol to be identical in pixel composition to another region of at least one symbol previously assigned; and
   assigning a reference to that previous determination for that identical region.

8. A method as claimed in claim 7, wherein said reference comprises a predetermined pointer tag.

9. A method as claimed in claim 8, wherein said pointer tag is 001.

10. A method as claimed in claim 1, wherein said scanning is a scanning derived from a Morton-type scanning.

11. A method as claimed in claim 10, wherein said scanning further comprises:
separating said area in groups of four pixels arranged in a square from left to right and top to bottom;
scanning each pixel in said group from left to right, top to bottom.

12. A method as claimed in claim 1, wherein said first color is white and said second color is black.

13. A method as claimed in claim 1, wherein said type symbol has a maximum of three bits.

14. A method as claimed in claim 1, wherein said content symbol has a maximum of two bits.

15. A method as claimed in claim 1, wherein said type symbol for a first color area is 01.

16. A method as claimed in claim 1, wherein said type symbol for a second color area is 000.

17. A method as claimed in claim 1, wherein said type symbol for a complex area is 10.

18. A method as claimed in claim 1, wherein said type symbol for a coordinates area is 11.

19. A system for dynamic compression of digital binary images encoded using a matrix of pixels, each pixel of said matrix of pixels having one of a first and a second color, comprising:
an image retriever for providing said image;
a symbol memory for providing type symbols and content symbols, wherein a type symbol is defined for each one of a first color area, a second color area, a complex area and a coordinates area, wherein said area is square, said first color area is an area in which all pixels are of said first color, said second color region is a region in which all pixels are of said second color, said complex region is a region in which there is at least one pixel of said second color on each side of said region and said coordinates region is a region in which there is at least one side with only pixels of said first color; and wherein a content symbol is defined for each one of a first color zone, a second color zone and a mixed color zone, wherein said first color zone is a zone in which all pixels are of said first color, said second color zone is a zone in which all pixels are of said second color and said mixed color zone is a zone in which there are pixels of said first color and said second color;
a splitter for dividing the image into 16×16 pixels areas;
a type determiner for determining an area type for each area;
a type symbol retriever for assigning a corresponding one of said type symbols to said area;
a subdivider for recursively subdividing each mixed color zone into four quadrants in each area determined to be of a complex type and instructing a content determiner for determining a color content for each quadrant and a content symbol retriever for assigning a corresponding one of said content symbol to said quadrant, until each pixel in said area is identified with said content symbol at any level of said subdividing
a scanner for scanning each area determined to be of a coordinates type in groups of four pixels and instructing said content determiner to determine a color content of each group of four pixels and said content symbol retriever to assign a corresponding one of said content symbol to said group of four pixels and, for each group assigned with said mixed color zone symbol, determining a color of each pixel in said group; assigning a corresponding one of said content symbol to each said pixel in said group;
an output memory for storing all assigned type and content symbols into a compression data file for said image.

20. A system as claimed in claim 19, further comprising a statistical analyser for comparing a number of first color pixels to a number of second color pixels in said area determined to be of a complex type to ensure that a most common one of said pixel color is encoded using a smallest content symbol in said symbol memory.

21. A system as claimed in claim 19, further comprising:
a border provider for providing a border tag for each border type, wherein a border type is identified by a shape of a distribution of pixels in a coordinates area;
a border determiner for determining a border type for said coordinates area;
a border retriever for assigning a corresponding one of said border tags to said coordinates area.

22. A system as claimed in claim 21, further comprising:
a similarity identifier for identifying a region of at least one symbol to be identical in pixel composition to another region of at least one symbol previously assigned; and
a reference matcher for assigning a reference to that previous determination for that identical region.

23. A system as claimed in claim 22, wherein said reference uses a predetermined pointer tag stored in said symbol memory.

* * * * *